(12) United States Patent
Valentin (10) Patent No.: US 9,031,930 B2
(45) Date of Patent: May 12, 2015

(54) DATA BROWSER FOR GROUP-BY DATA ACCESS

(75) Inventor: Marco Valentin, Malsch (DE)

(73) Assignee: SAP SE, Walldorf (DE)

( * ) Notice: Subject to any disclaimer, the term of this patent is extended or adjusted under 35 U.S.C. 154(b) by 86 days.

(21) Appl. No.: 13/335,740

(22) Filed: Dec. 22, 2011

(65) Prior Publication Data
US 2013/0166531 A1    Jun. 27, 2013

(51) Int. Cl.
*G06F 17/30* (2006.01)

(52) U.S. Cl.
CPC .... *G06F 17/30392* (2013.01); *G06F 17/30445* (2013.01); *G06F 17/30427* (2013.01)

(58) Field of Classification Search
CPC .............. G06F 17/30445; G06F 17/30489; G06F 17/30592; G06F 17/30392; G06F 17/30427
USPC ......... 707/713, 705, 714, 722, 736, 740, 748, 707/752, 759, 763, 769, 781, 783
See application file for complete search history.

(56) References Cited

U.S. PATENT DOCUMENTS

| | | | |
|---|---|---|---|
| 6,757,677 B2* | 6/2004 | Pham et al. | 707/999.004 |
| 7,730,079 B2* | 6/2010 | Meijer et al. | 707/760 |
| 7,865,533 B2* | 1/2011 | Meijer et al. | 707/804 |
| 7,921,106 B2* | 4/2011 | Chen et al. | 707/723 |
| 8,095,512 B2* | 1/2012 | Barsness et al. | 707/652 |
| 8,126,870 B2* | 2/2012 | Chowdhuri et al. | 707/713 |
| 8,161,034 B2* | 4/2012 | Dettinger et al. | 707/713 |
| 8,364,724 B2* | 1/2013 | Stolte et al. | 707/805 |
| 8,601,038 B2* | 12/2013 | Plattner et al. | 707/899 |
| 8,767,019 B2* | 7/2014 | Heinrich et al. | 345/661 |
| 2007/0294215 A1* | 12/2007 | Boss et al. | 707/2 |
| 2009/0319501 A1* | 12/2009 | Goldstein et al. | 707/4 |
| 2013/0132333 A1* | 5/2013 | De Smet et al. | 707/600 |

* cited by examiner

*Primary Examiner* — Jay Morrison
*Assistant Examiner* — Dangelino Gortayo
(74) *Attorney, Agent, or Firm* — Mintz Levin Cohn Ferris Glovsky and Popeo, P.C.

(57) ABSTRACT

Methods and apparatus, including computer program products, are provided for group-by access of a database. In one aspect there is provided a method. The method may include receiving from a user interface information defining a database and a database table; converting the received information into at least one instruction for performing the group-by and the sum at the database table included in the database; sending the at least one instruction to the database; receiving, in response to the at least one instruction sent, a result-set from the database, the result-set representative of the group-by and the sum of the database table; and providing the result-set to an interface. Related systems and articles of manufacture are also discloses.

11 Claims, 6 Drawing Sheets

DATA BROWSER FOR GROUP-BY DATA ACCESS

FIELD

The present disclosure generally relates to database processing and, in particular, performing group-by access of a database.

BACKGROUND

In databases systems, a query may be used to select data from one or more tables of a database. For example, in SQL, the select instruction is used to select the data from the database. The select instruction may be used in conjunction with other instructions, such as a group-by instruction. The group-by instruction is a database instruction that may be used with an aggregation function, such as a sum, an average, and the like, to group the result-set by one or more columns.

SUMMARY

In one aspect there is provided a method. The method may include receiving from a user interface information defining a database and a database table; converting the received information into at least one instruction for performing a group-by and a sum at the database table included in the database; sending the at least one instruction to the database; receiving, in response to the at least one instruction sent, a result-set from the database, the result-set representative of the group-by and the sum of the database table; and providing the result-set to an interface.

In some implementations, the above-noted aspects may further include additional features described herein including one or more of the following. Information representative of the group-by and the sum to be performed at the database table may be received from the user interface. The database may be configured as at least one of an in-memory database and a column-store database. The at least one instruction may be converted into at least one instruction configured to be executed at the database configured as at least one of an in-memory database and a column-store database. The converting may be implemented at a first processor separate from the database configured as at least one of an in-memory database and a column-store database. The result-set may be provided as a page presented at the user interface. The sum and the group-by may be performed at the database configured as at least one of an in-memory database and a column-store database.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings,
FIG. 1C depicts an example system for performing a group-by;

DETAILED DESCRIPTION

Figure 1A:
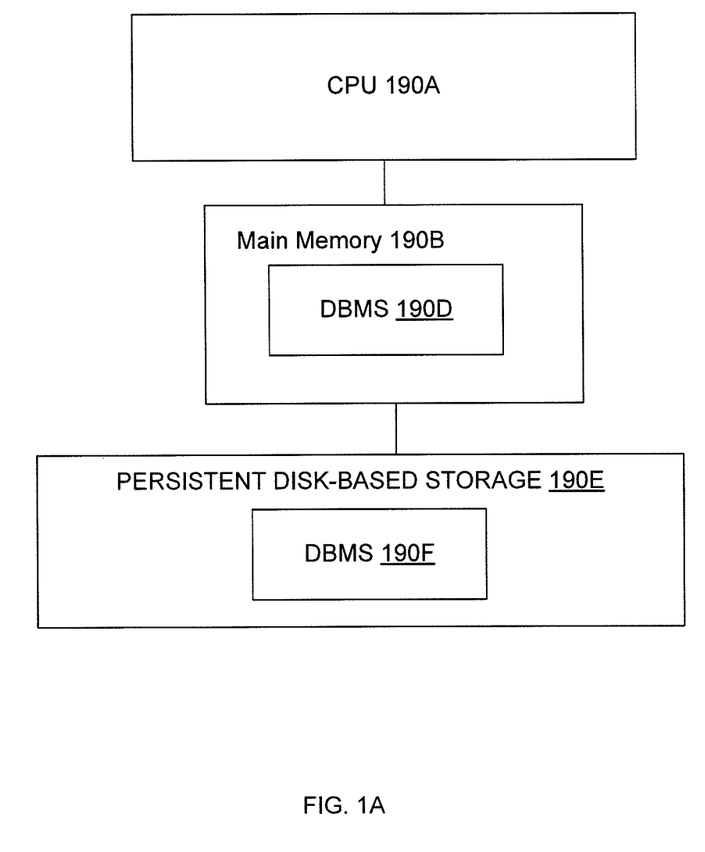
FIG. 1A depicts an example of an in-memory system.

In-memory databases refer to databases in which the data is stored in memory, rather than in slower persistent, mechanical storage, such as a hard drive, an optical drive, and the like. The use of in-memory databases may, in some implementations, enhance the performance of databases by speeding up data access times. FIG. 1A depicts a system including a central processing unit (CPU) 190A, main memory 190B including a database management system (DBMS) 190D, and a persistent, disk-based storage 190E including another DBMS 190F. In the example implementation of FIG. 1A, a database engine, such as DBMS 190D, and the relevant data for the database engine are primarily maintained in main memory 190B. When this is the case, any queries and/or calculations performed on the data use main memory 190B and database 190D, rather than disk-based storage 190E and database 190F. In some implementations, such use of main memory 190B reduces data access latency times by at least an order of about 200.

Figure 1B:
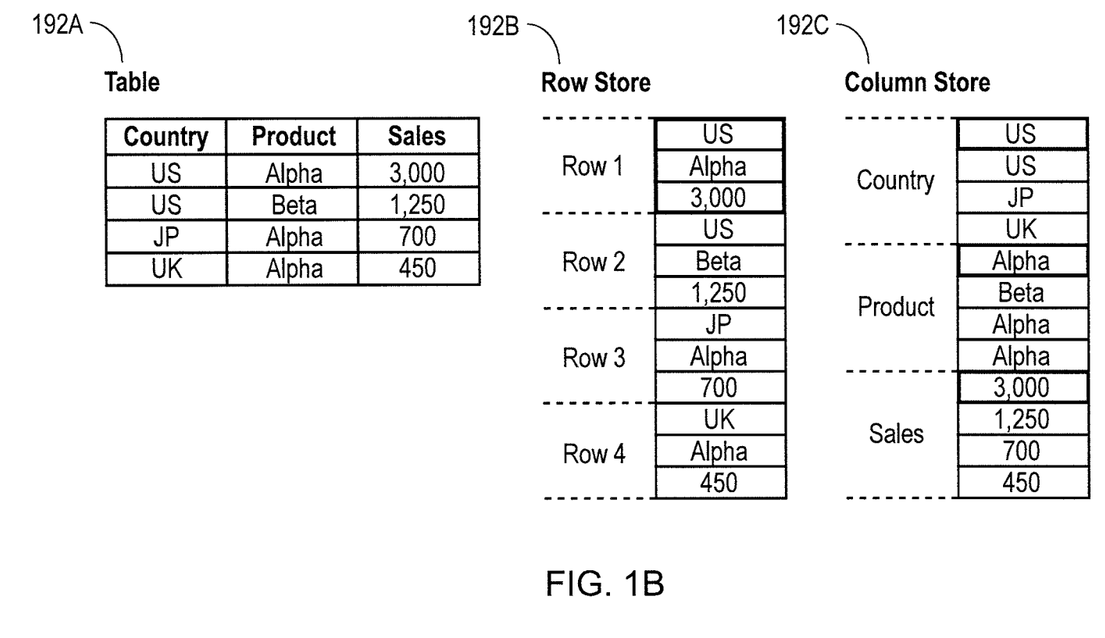
FIG. 1B depicts examples of column store and row store.

In-memory databases may also be configured as column-based databases (also referred to as column-store databases), which in some implementations may further enhance performance. Referring again to FIG. 1A, the database 190D may be implemented as a column-oriented database, although a row-oriented database may be used as well. A column-oriented database refers to a database management system configured to store relevant data based on columns, not rows. On the other hand, a row-oriented database refers to a database management system configured to store relevant data based on rows, not columns. FIG. 1B depicts a table 192A including relevant data for country, product, and sales. In a row-oriented database, the relevant data is stored based on rows as depicted at row store 192B; while in a column-oriented database, the relevant data is stored based on columns as depicted at column store 192C. Although the examples described herein refers to in-memory column databases, other types of databases may be used as well.

In-memory, column-based databases may provide performance gains, but may also require tools, such as processes and mechanisms to allow ready access to data stored in the column-based databases, without the end-users having to develop their own programs to access such column-based data. System 100 described further below may provide a generic, yet flexible way to access data directly from in-memory, column-based databases by providing a user interface defining a location of a database and the group-by and summarization functions, without requiring the user to write code (e.g., SQL) to perform the group-by and summarization of data at the database. Moreover, system 100 may be implemented as part of a business system, such as an enterprise resource planning systems, and, when this is the case, system 100 may allow the data access to be delivered and/or presented within the business system via a user interface.

Figure 1C:
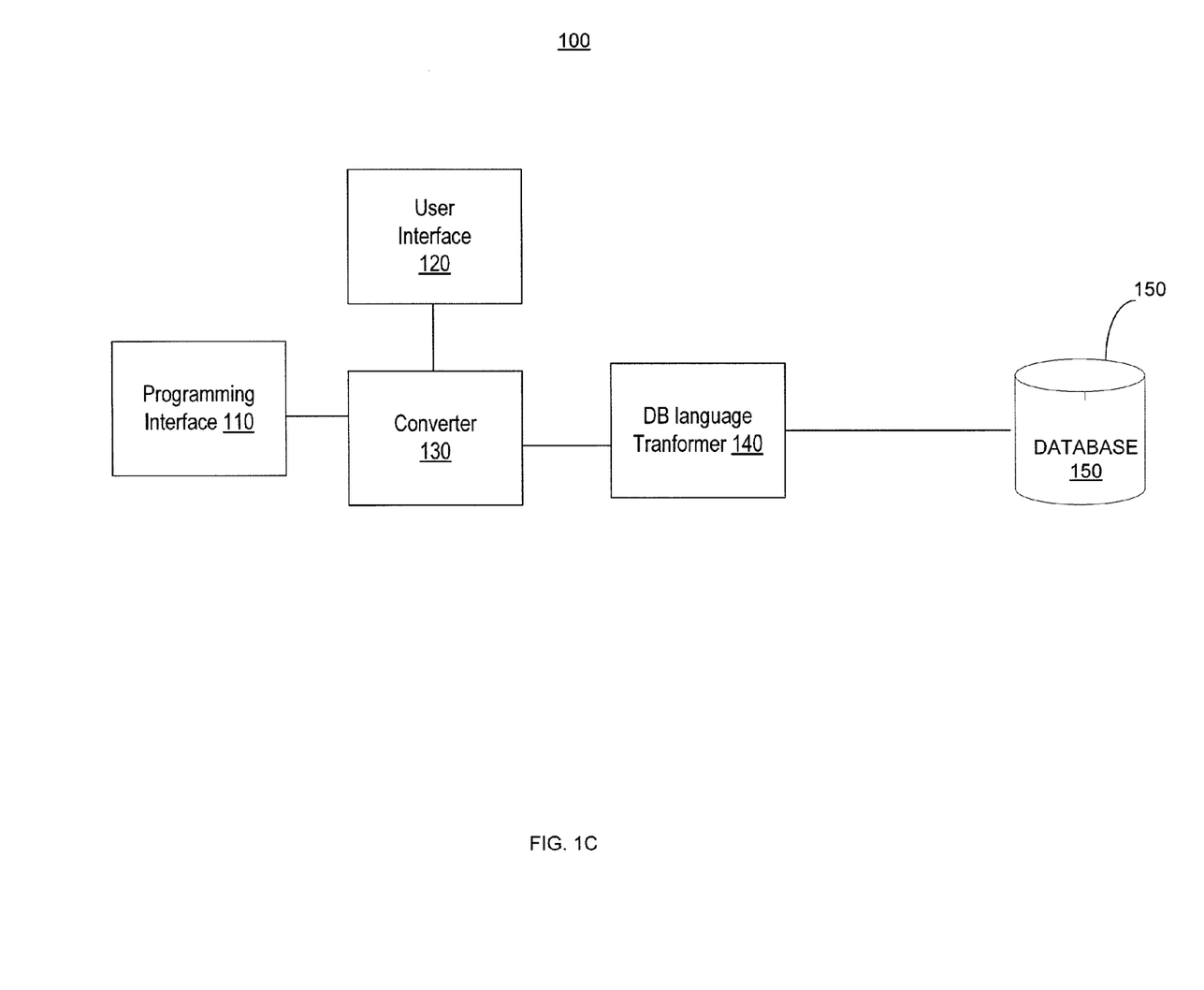

FIG. 1C depicts an example of system 100 for performing a group-by of data at a database 150, which may be configured as an in-memory, column-based database.

System 100 includes a programming interface 110, where users may couple to in order to access system 100. For example, a user interface and/or other module may couple to system 100 via programming interface 110. The programming interface 110 may be coupled (e.g., via a link or a network, such as the Internet and/or an intranet) to a converter 130, which is described further below.

System 100 may include a user interface 120. The user interface 120 may be implemented as any type of user interface (e.g., a browser, a thin client, and the like) enabling access to converter 130 and/or for presenting pages (e.g., HTML pages). User interface 120 may be configured to allow a user to provide information defining a group-by access of database 150 and the information may define an aggregation function, such as a sum, of the group-by data accessed at database 150. User interface 120 may enable a user to define a database, such as in-memory, column-based database 150, define a database table at database 150, and define a group-by and sum, without the user having to understand the technical implementation of database 150 (or the corresponding database language/commands operative at the database), which may, in some implementations, reduce, and/or eliminate the need for the user to prepare code, such as a SQL, to perform the group-by and sum. The user interface 120 may also be configured to define the location of the database and/or database tables (or columns, fields, and the like therein) being accessed at in-memory, column-based database 150.

Figure 2A:
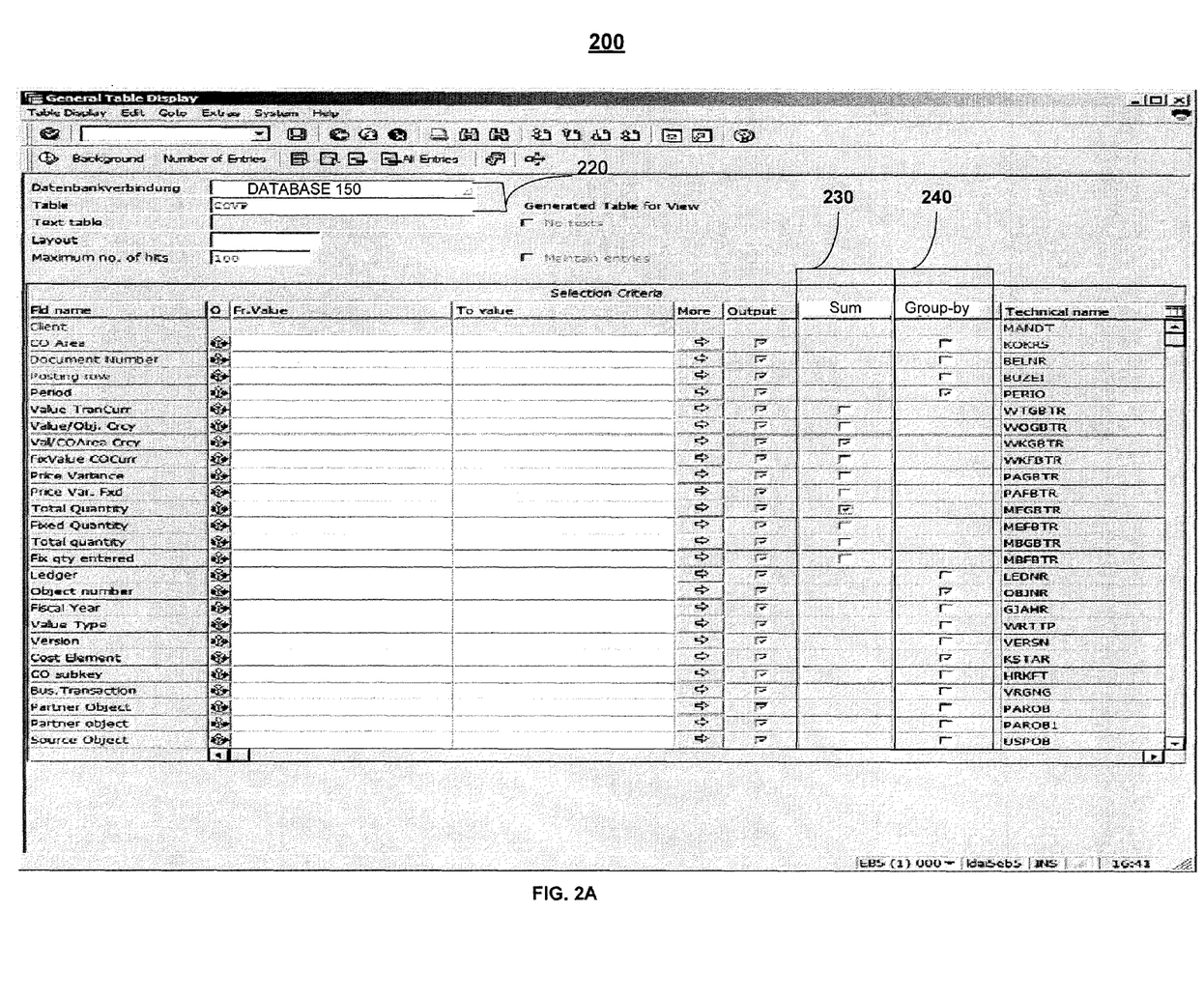
FIG. 2A depicts an example of a user interface where information is provided to define a database, a group-by, and a summarization for data selected from a database table at the database.

FIG. 2A depicts an example page 200 presented at user interface 120. Page 200 may be called by another system, such as a business system, or by system 100. In any case, a user may provide information at 220 defining the database tables (also referred to herein as tables) to be read from in-memory, column database 150 and the location (or database connection) of database 150. For example, the information provided at 220 includes the identity (e.g., a database connection identifier, a name, a location, an address, and the like) of in-memory, column-based database 150 and a table therein identified as "COVP."

At 230, the user may select the summarization column at page 200 and then further select any fields (e.g., by clicking on the check box and the like) that are to be read from the in-memory, column-based database 150. For example, at 230, the fields "Val/CO Area Crcy" and "Total Quantity" have been selected, which indicates that for the selected fields a statement to in-memory, column-based database 150 is generated that totals the selected fields directly in the in-memory, column-based database 150. Moreover, the in-memory, column-based database 150 responds with a result-set including the total of all lines matching the general selection criteria. For example, if there are 2000 lines that match the initial criteria, the result-set may condense the content of "Val/CO Area Crcy" and "Total Quantity" of all 2000 lines into a result line.

At 240, the user may select (e.g., by clicking on the check box and the like) any fields that are to be used by the group-by function. For example, at 240, fields "Period," "Object number," and "Cost Element" have been selected, which indicates that the selected fields are the "separators" for the sum (or totaling function). For example, the select on in-memory, column-based database 150 may find 10,000 records, and, as such, when a Period, Object Number, and Cost element are selected as "group-by" fields, the Period, Object Number, and Cost element fields remain visible in the result-set list, whereas all other fields will be condensed and will be blank in the result-set list. Table 1 depicts an example with five lines. The result of the select with Period, Cost Element, and Object Number being grouped and Val/CO Area Crcy being summed will lead to a result-set as in the example at Table 2.

TABLE 1

| Period | Cost Element | Object Number | Val/CO Area Crcy | Activity |
|---|---|---|---|---|
| 1 | 400000 | ON0001 | 1000 | RKIU |
| 1 | 400000 | ON0001 | 2000 | RKU1 |
| 1 | 410000 | ON0001 | 4000 | COIN |
| 1 | 410000 | ON0002 | 5000 | RKIV |
| 1 | 410000 | ON0002 | 3000 | COIN |

TABLE 2

| Period | Cost Element | Object Number | Val/CO Area Crcy | Activity |
|---|---|---|---|---|
| 1 | 400000 | ON0001 | 3000 | — |
| 1 | 410000 | ON0001 | 4000 | — |
| 1 | 410000 | ON0002 | 8000 | — |

The grouped fields may still appear in a list and the values may contain the total of all lines. Any fields not being grouped may not be visible as they are condensed into the result line (e.g., Activity). The input fields at FIG. 2A "Fr Value" and "to Value" may limit the result of the selection to a certain criteria. By entering a Period 1, for example, the result is limited to only values for Period 1. With such selection criteria, the user may decide whether to see a large amount of data or only specific portion of the data. The "More" buttons at FIG. 2A are configured to allow entry of more information which can limit the selection of data for the result-set. The column "Output" may indicate whether a given field is included in the result-set or hidden. The "Technical name" column represents a name of a column in the database, which can be used to differentiate between two fields that have the same field name. Thus, page 200 allows the user to define, at a user interface, a group-by and a sum of database 150, without writing an SQL program.

The information at page 200 is provided to converter 130. The converter 130 may be configured to receive information defining the database and database table (provided at 220 at page 200), a group-by selection (provided at 240 at page 200), a sum (provided at 230 at page 200), and other parameters as noted above with respect to FIG. 2A. Although this information may be received from user interface 120, it may also be received from another user interface or another processor via programming interface 110.

The converter 130 may convert the received information defining the database and group-by and sum functions into one or more instructions for performing a query of database 150 to enable selection at in-memory, column-based database 150 of data for the group-by and sum. Converter 130 may be configured to process any inputs from a received format from programming interface 110 and/or user interface 120 into a format used within system 100. The converter 130 may also check the format and syntax of the inputs/received information.

The system 100 may further include a database transformer 140 for transforming the instructions output by converter 130 into one or more database commands in a format (or language) operative with the types of databases being accessed for the group-by and sum. For example, database transformer 140 may convert the instructions provided by converter 130 into a format (e.g., language and the like) compatible with database 150, so that database transformer 140 directly accesses database 150 using, for example, a group-by and sum instructions in a format compatible with database 150. Although FIG. 1C depicts only a single database, in some implementations, other databases may be included as well. When this is the case, database transformer 140 converts the instructions provided by converter 130 into a format compatible with each of the other databases. In any case, database transformer 140 receives the response to the query from database 150 (or other accessed databases) and provides the result-set, as depicts at FIG. 2B.

Figure 2B:
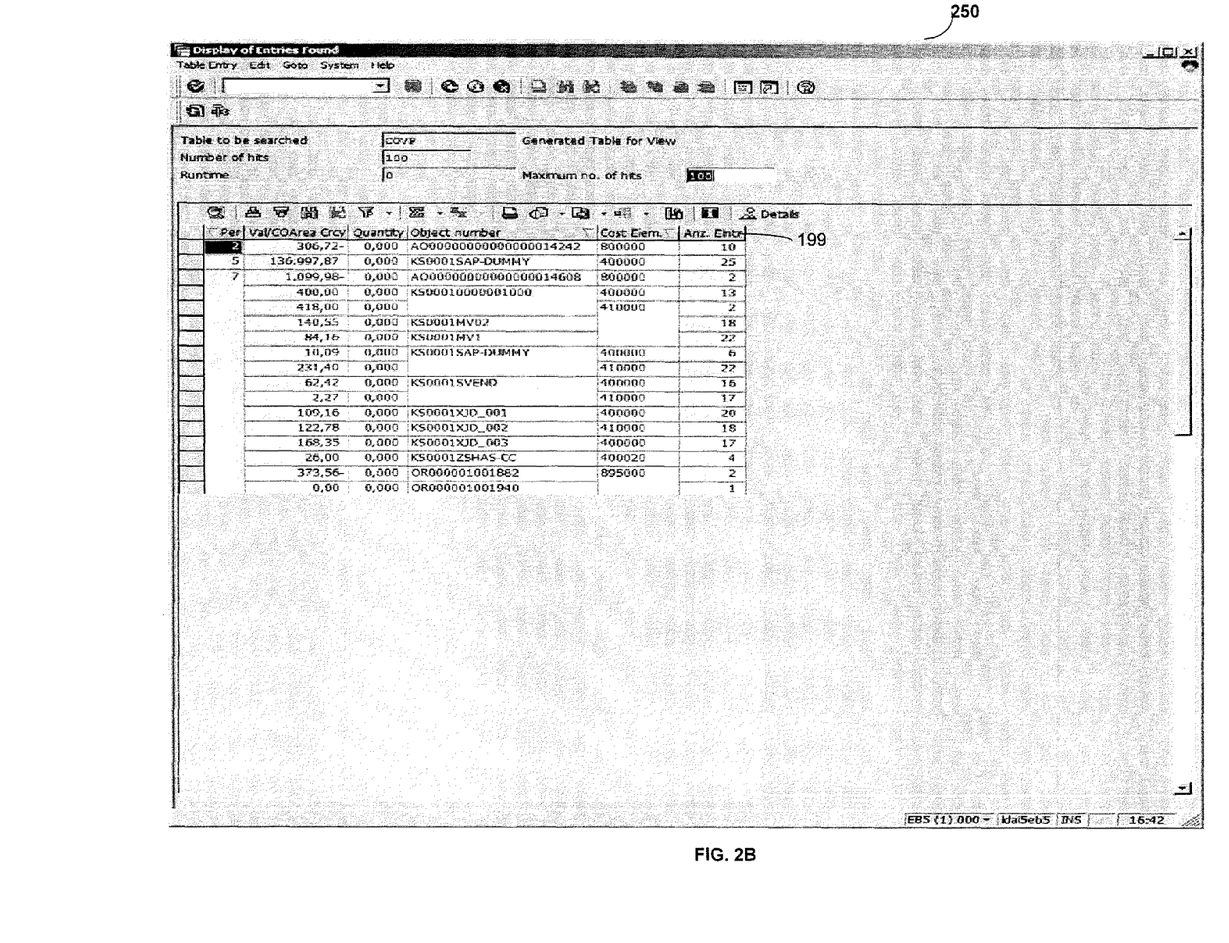
FIG. 2B depicts an example of a result-set.

FIG. 2B depicts an example page 250 including the result-set of the group-by and sum defined at page 200. For example, the columns for Period (labeled "Per"), Object Number, and Cost Element contain values that may appear in more than one line. These columns are the grouping indicators that define to which level the value-columns will be totaled. The columns Val/CO Area Crcy and Quantity contain the total of all values that correspond to the combination of Period, Object Number, and Cost Element. In the last column 299, a number of entries are condensed into the set of grouping fields. For example, line 1 consists of 10 items that have the same values in Period, Object Number, and Cost Element. The total in Val/CO Area Crcy of these 10 lines is 306.72. The total in Quantity is 0.000. With this kind of selection, aggregation (or summarization) levels may be built with the defined summarization fields. When the grouping on Cost Element are de-selected, the result-set will build a summarization level based on Period and Object Number, but not on Cost Element. As such, the check boxes at page 200 allow a user to create a variety of summarization levels with each database table, without having to do complex customization/development. The results-set at page 250 may be presented at user interface 120, provided to interface 110 (e.g., where another processor and/or user interface may be coupled), and/or stored at in-memory, column-based database 150.

Figure 3:
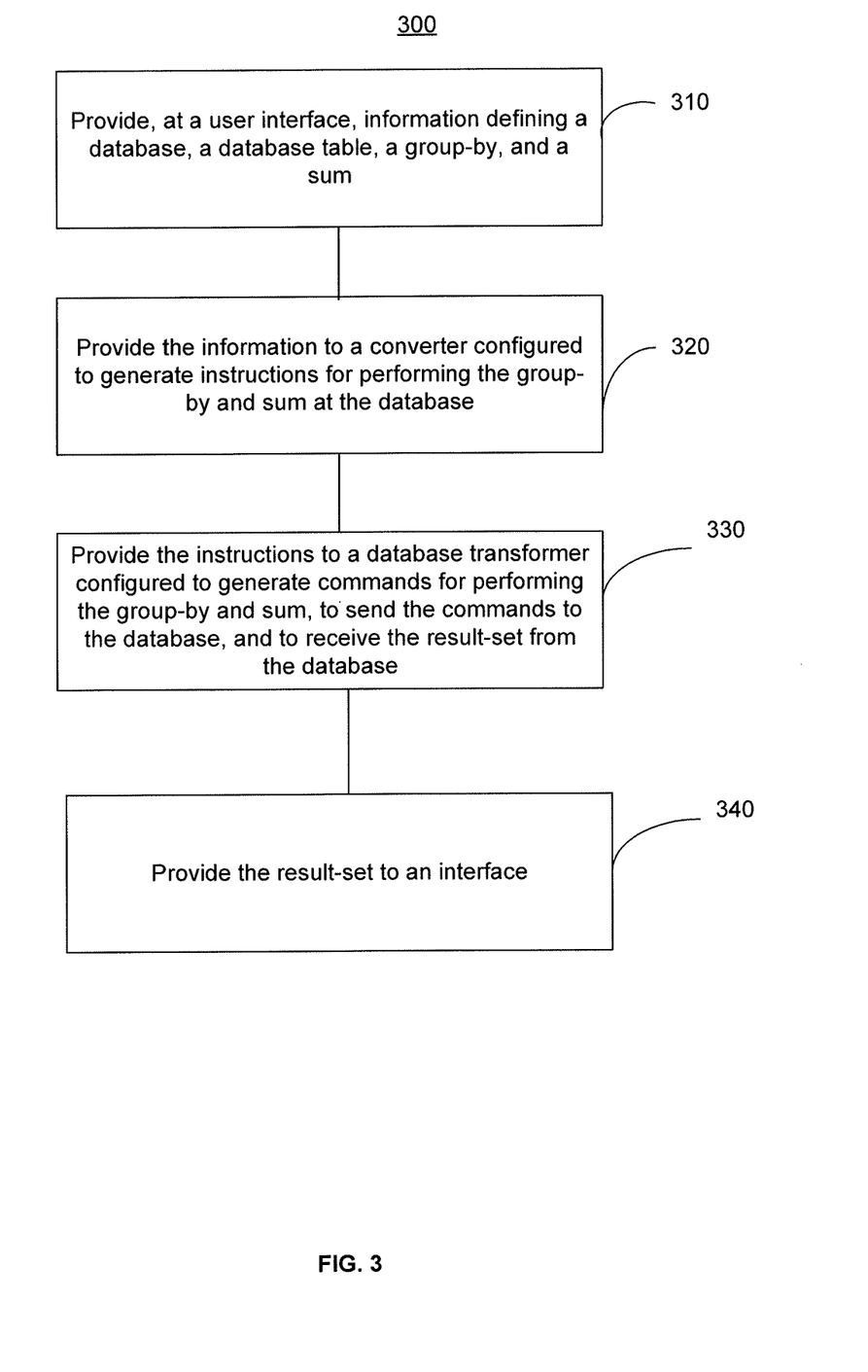
FIG. 3 depicts an example process for performing the group-by.
Like labels are used to refer to same or similar items in the drawings.

FIG. 3 depicts a process 300 for performing a group-by and sum.

At 310, information is provided defining a database, a group-by, and a sum. For example, at page 200, a user defines, at 220, the database and the database table(s), defines, at 240, the group-by, and defines, at 230, the sum.

At 320, the information provided at user interface 120 is provided to converter 130, which generates instructions for performing a group-by and a sum of a database, such as in-memory, column-based database 150.

At 330, the converter 130 provides the instructions to database transformer 140. Database transformer 140 generates code, such as SQL code and the like, to query in-memory, column database 150 to select data from the defined database table, and then perform the group-by and sum in accordance with the information provided at 310. The database transformer 140 receives the result-set and generates a page, an example of which is depicted at FIG. 2B.

At 340, the result-set is provided to an interface. For example, database transformer 140 may provide the result-set, such as page 250, to user interface 120 and/or programming interface 110, as noted above.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

Although a few variations have been described in detail above, other modifications are possible. For example, while the descriptions of specific implementations of the current subject matter discuss analytic applications, the current subject matter is applicable to other types of software and data services access as well. Moreover, although the above description refers to specific products, other products may be used as well. In addition, the logic flows depicted in the accompanying figures and described herein do not require the particular order shown, or sequential order, to achieve desirable results. Other embodiments may be within the scope of the following claims.

What is claimed:

1. A non-transitory computer-readable medium containing instructions to configure at least one processor to cause operations comprising:

receiving, from a user interface, information representative of a selection of a database and a database table, the information further representative of at least one function to be performed at the database table;

selecting, based on the information, the database and the database table, the selecting of the database performed from among a plurality of databases, and the selecting of the database table performed from among a plurality of database tables of the selected database;

converting the information into at least one instruction for performing the at least one function comprising a group-by and a sum at the database table included in the selected database;

transforming the at least one instruction into a database command, the database command in a format compatible with the selected database, the format based on whether the selected database is a column-store database or a row-store database;

sending the database command to the database;

receiving, in response to the database command sent, a result-set from the database, the result-set representative of the group-by and the sum of the database table; and providing the result-set to an interface comprising at least one of the user interface or a programming interface.

2. The non-transitory computer-readable medium of claim 1, wherein the converting is implemented at a first processor separate from the database configured as at least one of an in-memory database and a column-store database.

3. The non-transitory computer-readable medium of claim 1, wherein the providing further comprises:
providing the result-set as a page presented at the user interface.

4. The non-transitory computer-readable medium of claim 1, wherein the selected database further comprises an in-memory database.

5. A method comprising:
receiving, from a user interface, information representative of a selection of a database and a database table, the information further representative of at least one function to be performed at the database table;

selecting, based on the information, the database and the database table, the selecting of the database performed from among a plurality of databases, and the selecting of the database table performed from among a plurality of database tables of the selected database;

converting the information into at least one instruction for performing the at least one function comprising a group-by and a sum at the database table included in the selected database;

transforming the at least one instruction into a database command, the database command in a format compatible with the selected database, the format based on whether the selected database is a column-store database or a row-store database;

sending the database command to the database;

receiving, in response to the database command sent, a result-set from the database, the result-set representative of the group-by and the sum of the database table; and providing the result-set to an interface comprising at least one of the user interface or a programming interface.

6. The method of claim 5, wherein the converting is implemented at a first processor separate from the database configured as at least one of an in-memory database and a column-store database.

7. The method of claim 5, wherein the providing further comprises:
providing the result-set as a page presented at the user interface.

8. The method of claim 5, wherein the selected database further comprises an in-memory database.

9. A system comprising:
at least one processor; and
at least one memory including code, which when executed by the at least one processor causes operations comprising:

receiving, from a user interface, information representative of a selection of a database and a database table, the information further representative of at least one function to be performed at the database table;

selecting, based on the information, the database and the database table, the selecting of the database performed from among a plurality of databases, and the selecting of the database table performed from among a plurality of database tables of the selected database;

converting the information into at least one instruction for performing the at least one function comprising a group-by and a sum at the database table included in the selected database;

transforming the at least one instruction into a database command, the database command in a format compatible with the selected database, the format based on whether the selected database is a column-store database or a row-store database;

sending the database command to the database;

receiving, in response to the database command sent, a result-set from the database, the result-set representative of the group-by and the sum of the database table; and providing the result-set to an interface comprising at least one of the user interface or a programming interface.

10. The system of claim 9, wherein the converting is implemented at a first processor separate from the database configured as at least one of an in-memory database and a column-store database.

11. The system of claim 9, wherein the providing further comprises:
providing the result-set as a page presented at the user interface.

* * * * *